(12) United States Patent
Dietl et al.

(10) Patent No.: US 6,786,193 B2
(45) Date of Patent: Sep. 7, 2004

(54) METHOD AND DEVICE FOR ADJUSTING OPENING TIME OF A FUEL INJECTOR FOR MOUNTING A DIRECT INJECTION INTERNAL COMBUSTION ENGINE

(75) Inventors: Franz Dietl, Regensburg (DE); Holger Rukwid, Frouzins (FR); Frederic Galtier, Montpellier (FR)

(73) Assignee: Siemens VDO Automotive, Toulouse (FR)

( * ) Notice: Subject to any disclaimer, the term of this patent is extended or adjusted under 35 U.S.C. 154(b) by 0 days.

(21) Appl. No.: 10/467,079

(22) PCT Filed: Jan. 14, 2002

(86) PCT No.: PCT/EP02/00282

§ 371 (c)(1),
(2), (4) Date: Jan. 5, 2004

(87) PCT Pub. No.: WO02/063164

PCT Pub. Date: Aug. 15, 2002

(65) Prior Publication Data

US 2004/0094119 A1 May 20, 2004

(30) Foreign Application Priority Data

Feb. 5, 2001 (FR) .............................................. 01 01503

(51) Int. Cl.$^7$ ................................................. F02B 3/00
(52) U.S. Cl. .................... 123/299; 123/305; 123/406.23
(58) Field of Search ................................. 123/295, 299, 123/304, 305, 406.23

(56) References Cited

U.S. PATENT DOCUMENTS

| 5,038,744 | A | | 8/1991 | Martin et al. |
| 5,329,907 | A | * | 7/1994 | Nonaka ...................... 123/478 |
| 5,875,761 | A | | 3/1999 | Fujieda et al. |
| 6,032,650 | A | | 3/2000 | Rask |
| 6,491,024 | B1 | * | 12/2002 | Connolly et al. ...... 123/406.19 |
| 6,561,158 | B2 | * | 5/2003 | Yoshida et al. ............. 123/295 |
| 6,708,668 | B2 | * | 3/2004 | Yoshida et al. ............. 123/295 |
| 6,725,830 | B2 | * | 4/2004 | Surnilla ................. 123/339.11 |

FOREIGN PATENT DOCUMENTS

| EP | 0 652 363 | 5/1995 |
| EP | 0 893 600 | 1/1999 |

* cited by examiner

Primary Examiner—John T. Kwon
(74) Attorney, Agent, or Firm—Young & Thompson

(57) ABSTRACT

According to this method, a) a series of sparks is emitted into an engine cylinder (1), filled with an air/fuel mixture to be ignited, at predetermined successive instants, b) one of the sparks that initiates the ignition of the mixture is identified, c) the difference separating the instant of emission of the spark from a predetermined ignition instant able to ensure that the engine supplies a predetermined mechanical power is evaluated, and d) the instant of opening of the fuel injector (3) is corrected as a function of the difference, so as to initiate subsequent ignitions of the air/fuel mixture in the cylinder (1) at the predetermined instant.

8 Claims, 1 Drawing Sheet

METHOD AND DEVICE FOR ADJUSTING OPENING TIME OF A FUEL INJECTOR FOR MOUNTING A DIRECT INJECTION INTERNAL COMBUSTION ENGINE

CROSS REFERENCE TO RELATED APPLICATION

This is the 35 USC 371 national stage of International Application PCT/EP02/00282 filed on Jan. 14, 2002, which designated the United States of America.

FIELD OF THE INVENTION

The present invention relates to a method for setting the instant of opening of a fuel injector in a cylinder of a direct-injection internal combustion engine.

BACKGROUND OF THE INVENTION

In an engine of this type, particularly one using the "stratified charge" mode of combustion, it is important for the fuel involved in the composition of the air/fuel mixture to be burned in the engine cylinders, to be introduced into each cylinder at a moment chosen so that this mixture precisely reaches the electrodes of a spark plug for igniting the mixture at the moment when the electrodes emit a spark. It is only by doing this that correct combustion of the mixture can be ensured and, in particular, that effective protection can be had against any possibility of a misfire.

Significant effort needs therefore to be put into setting the instant of opening of the injector before such an engine can enter service, namely before a motor vehicle powered by this engine can be put in circulation for example.

This setting is made necessary by inevitable manufacturing tolerances affecting various parts of the engine or associated with the latter. Furthermore, during the life of the engine, the instant-of-opening-setting may drift, or need tweaking as a result, for example, of the aging of the aforesaid parts.

These difficulties can be overcome by lengthening the time for which a spark is likely to initiate combustion of the mixture or by multiplying the ignition sparks in such a way that at least one of them is present at the moment when the mixture to be burnt reaches the electrodes of the spark plug.

These measures unfortunately have the effect of shortening the working life of the spark plug, leading to costly replacements thereof.

Furthermore, as the actual instant of ignition of the mixture then remains unknown, the engine management computer conventionally used is unable to evaluate precisely the torque delivered by this engine. Engine control strategies based on knowledge of this torque (elimination of torque surges, rapid reduction of torque when the transmission changes gear, for example) are then difficult, if not impossible, to implement.

SUMMARY OF THE INVENTION

It is precisely an object of the present invention to provide a method for setting the instant of opening of a fuel injector in a cylinder of a direct-injection internal combustion engine, that does not suffer from the drawbacks mentioned hereinabove and that, in particular, allows the life of the engine spark plugs to be lengthened, and makes it possible to maximize and estimate precisely the torque delivered by this engine, while at the same time allowing the engine to be adapted easily to produce these results.

This object of the invention, together with others that will become apparent from reading the description that will follow, is achieved using a method for setting the instant of opening of a fuel injector in at least one of the cylinders of a direct-injection internal combustion engine, notable in that: a) a series of sparks is emitted into said cylinder, filled with an air/fuel mixture to be ignited, at predetermined successive instants, b) the one of said sparks that initiates said ignition of said mixture is identified, c) the difference separating the instant of emission of said spark from a predetermined ignition instant able to ensure that said engine supplies a predetermined mechanical power is evaluated, and d) the instant of opening of said fuel injector is corrected as a function of said difference, so as to initiate subsequent ignitions of the air/fuel mixture in said cylinder at said predetermined instant.

As will be seen in detail later on, by virtue of this correction it is then possible, using a single spark, to trigger combustion of the air/fuel mixture in the cylinder in such a way that it extends over a time interval chosen so that the engine then produces a predetermined performance, in terms of delivered torque for example. It is thus possible to set the instant of opening of the injector so that the delivered torque is a maximum, for example, for a given engine speed and load.

The invention also provides a device for implementing this method, comprising a) means able to emit a series of sparks into the engine cylinder when this cylinder is full of an air/fuel mixture that is to be ignited, b) means for detecting ignition of said mixture and delivering a corresponding signal, and c) calculation means sensitive to said signal and able to control, on the one hand, said means for emitting said series of sparks so that said sparks are emitted at predetermined respective instants and, on the other hand, the instant of opening of said fuel injector in said engine cylinder, on the basis of information contained in said signal.

BRIEF DESCRIPTION OF THE DRAWINGS

Other features and advantages of the present invention will become apparent from reading the description which will follow and from examining the attached drawing in which.

DETAILED DESCRIPTION OF THE INVENTION

Figure 1:
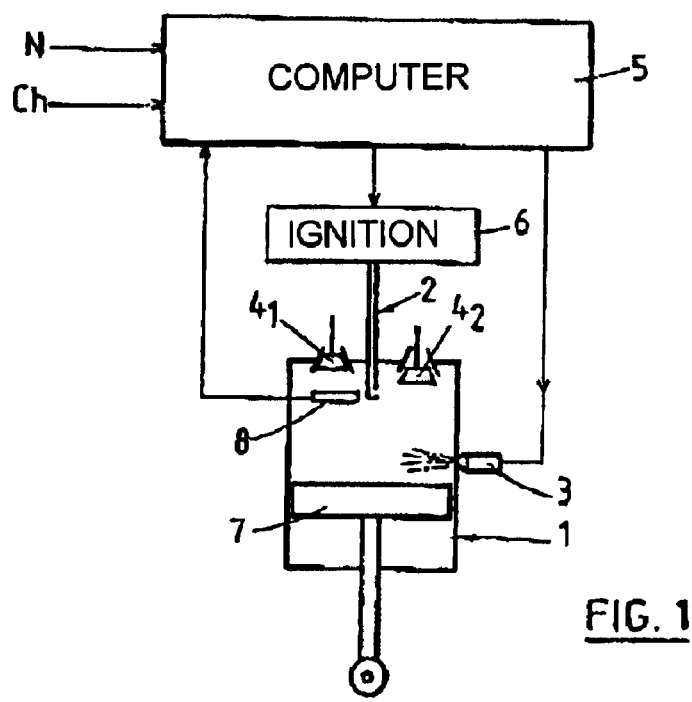
FIG. 1 is a diagram of a device for implementing the method according to the invention.

Reference is made to FIG. 1 of the attached drawing which schematically depicts a cylinder 1 forming part of an internal combustion engine, more specifically of the direct-injection type. Such a cylinder is equipped with a spark plug 2, with a fuel injector 3 opening onto the internal wall of the cylinder 1 and with several valves (intake or exhaust) like those referenced $4_1$, $4_2$, as is well known.

An engine management computer 5 is duly programmed to control the instant of opening and the duration of opening of the injector 3 and the instant at which a spark is emitted by the spark plug 2.

According to the present invention, the device further comprises an ignition module 6, known per se, able selectively, under the control of the computer 5, to cause the spark plug to emit a spark or several successive sparks, each of these sparks being emitted according to a predetermined "advance angle" measured with respect to the top dead center (TDC) of a piston 7 moving in the cylinder 1, at the end of the compression stroke compressing a mixture of air and fuel already introduced into this cylinder by appropriate control of the injector 3 and of the valves $4_1$, $4_2$.

According to the present invention, the device further comprises means for detecting the combustion of the air/fuel mixture. It is known that this combustion, initiated by a spark emitted by the spark plug, causes a sharp rise in the pressure and temperature of the mixture, it thus being possible for this combustion to be detected using a sensor 8 sensitive either to the pressure in the cylinder or to the ionization of the gases contained in the cylinder, under the effect of the increase in the temperature of these gases. As an alternative, this sensor 8, preferably placed near the spark plug, could be replaced by a monitoring of the current passing through the spark plug 2, after the emission of the spark, this current obviously being dependent on the ionization of the gas present between the electrodes of this spark plug.

Figure 2:
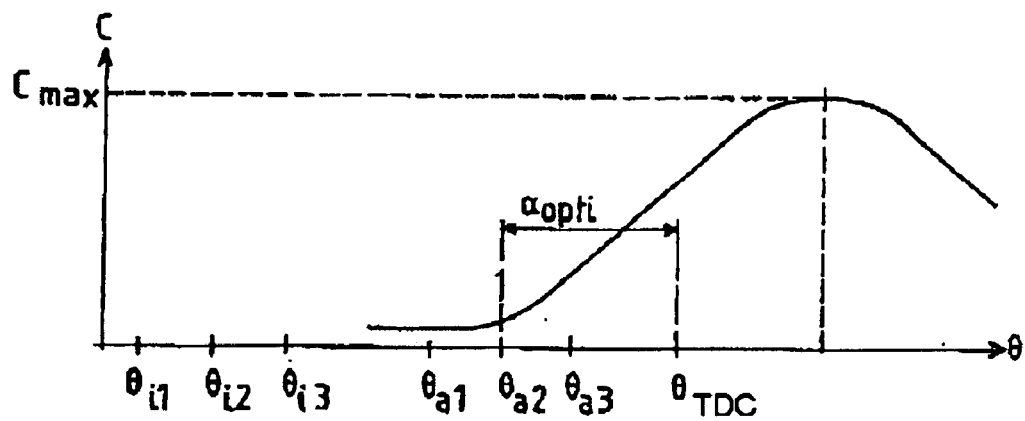
FIG. 2 is a graph illustrating the method according to the invention.

Reference is now made to the graph of FIG. 2 to describe the method for setting the instant of opening of the injector 3, implemented using the device of FIG. 1.

This graph represents the change in torque delivered by one of the cylinders of the engine during the combustion of the air/fuel mixture introduced into this cylinder, this torque being representative of the engine output mechanical power. As is well known, the events that follow one another to culminate in this combustion: opening of the injector 3, emission of a spark by the spark plug 2, occur at instants that are identified by an angle of rotation θ, the angle reached by the engine crankshaft that, as is known, rotates through 720° during a full "engine cycle", in the case of a four-stroke internal combustion engine, for example. More specifically, the instant at which an ignition spark is emitted is identified by the "ignition advance angle" $\alpha_{ign}$, equal to the angular "distance" separating this instant from the instant at which the piston 7 passes through top dead center TDC, which passing-through is identified by the corresponding angular position $\theta_{TDC}$ of the crankshaft mechanically connected to this piston.

In general, in the field of internal combustion engine control, the difference separating two successive events can be evaluated either in terms of an "angular difference" or in terms of a "time difference", these two expressions having to be considered as interchangeable in this description.

As illustrated by the graph of FIG. 2, during the combustion stroke when the air/fuel mixture is burnt, the torque delivered to the crankshaft by the piston 7 of the cylinder 1 increases, reaching a maximum $C_{max}$ after the piston 7 passes through top dead center $\theta_{TDC}$. The mean torque then delivered during combustion is advantageously maximized by initiating combustion at an "optimum" ignition advance angle $\alpha_{opti}$. This angle, dependent on the engine speed N and load Ch, is calculated by the computer 5 which can therefore control the excitation of the spark plug 3 accordingly.

The angle $\alpha_{opti}$ may advantageously be corrected to achieve the best possible compromise between the need to maximize the torque while at the same time minimizing the discharge of noxious exhaust gases into the atmosphere.

In order for the air/fuel mixture combustion stroke to progress in the ideal way, in the way described hereinabove, it is appropriate for the region of the mist of air/fuel mixture injected into the cylinder that reaches the electrodes of the spark plug then to be under determined pressure, temperature and fuel-concentration conditions able to ensure very reliable ignition of this mixture.

In the case of a direct-injection engine, particularly a stratified charge engine, a certain amount of time is needed for these conditions to be reached. It is therefore necessary for the opening of the fuel injector to precede the excitation of the spark plug (as the crankshaft passes to the position $\theta_{a2}$ in FIG. 2) by a time interval that corresponds to a predetermined angular difference that defines the crank angle $\theta_{i2}$ at which this opening needs to be triggered.

Because of the manufacturing tolerances that affect the precision of the performance of an engine and that in consequence cause the performance of a particular engine to deviate from the nominal performance, it may happen that, at the nominal advance angle fixed for ignition, the ideal ignition conditions mentioned hereinabove are not all fulfilled, and this may give rise to instability in the torque delivered by the engine, or even to misfires. This is why before an engine enters service it passes through a setup stage (known as "calibration").

A similar situation may be encountered throughout the life of the engine, because of drifts and wear that over time affect the operation of this engine.

According to the present invention, these disadvantages are alleviated by implementing the method for setting the instant of opening of the fuel injector according to the present invention, this method allowing the engine to "self-set" both before the engine enters service and throughout its working life, as will be seen later on.

This setting consists in testing, for example periodically and automatically, the ability of the air/fuel mixture to ignite at the predetermined optimum instant, namely when the crank angle reaches the value $\theta_{a2}$ having passed through the nominal value $\theta_{i2}$ of the angle of opening of the injector 3. The angular difference $(\theta_{a2}-\theta_{i2})$ is then adjusted to a nominal value leaving just enough time for the cloud of fuel introduced into the cylinder to reach the electrodes of the spark plug 2 at a pressure, a temperature and a fuel content in the air surrounding the electrodes that are all likely to ensure initiation of the combustion the air/fuel mixture at the instant a spark appears between the electrodes of the spark plug, namely when the crank angle reaches the value $\theta_{a2}$.

According to the invention, in order to perform this test, the computer 5 controls the ignition module 6 in such a way that the latter emits a series of sparks at predetermined successive instants corresponding for example to crank angles $\theta_{a1}$, $\theta_{a2}$, $\theta_{a3}$, the angles $\theta_{a1}$ and $\theta_{a3}$ preferably flanking the emission angle $\theta_{a2}$ of the nominal spark.

By virtue of the signal emitted by the sensor 8, or of the monitoring of the current passing through the spark plug, as seen above, the computer is informed of the state of the air/fuel mixture after each spark has been emitted, namely whether or not this mixture has ignited.

If the computer then recognizes, for example, that the ignition of the mixture is due to the spark emitted at the angle $\theta_{a1}$, that is to say to a spark emitted before the nominal spark (of angle $\theta_{a2}$), it deduces from this that the cloud of fuel has arrived at the spark plug electrodes early. The computer 5 then, for the subsequent combustion strokes, delays the injection of the fuel so as accordingly to delay the instant at which the air/fuel mixture can ignite, to the preferred nominal instant (angle $\theta_{a2}$). The magnitude Δt of this delay is set to the value of the time taken by the crankshaft to move from the angle $\theta_{a1}$ to the angle $\theta_{a2}$, which value the computer 5 can easily establish from the engine speed N.

When, on the other hand, it is the spark emitted at the angle $\theta_{a3}$ that initiates combustion of the mixture, while the earlier sparks emitted at $\theta_{a1}$ and $\theta_{a2}$ have yielded nothing, the computer 5 advances the opening of the injector 3 to the instant corresponding to the angle $\theta_{i1}$, the magnitude of this advance being calculated as indicated above.

The invention therefore makes it possible to recenter the air/fuel mixture combustion stroke on the interval of time which, for a given engine speed N and load Ch, allows this engine to produce maximum torque, benefiting the efficiency of this engine.

It is now apparent that the invention provides other advantages:

- it makes it possible to lengthen the life of the spark plug used, by comparison with that of a spark plug systematically producing several sparks in the initial part of each of the air/fuel mixture combustion strokes. Indeed, once the instant of opening of the injector has been set as described hereinabove, just one solitary spark is needed to ignite the air/fuel mixtures that follow one another in each engine cylinder.
- it allows the computer to evaluate, with precision, the torque delivered by the engine, by virtue of the precise setting of the instant of ignition of the mixture, combustion of which produces this torque.

Furthermore, the setting method according to the invention can readily be adapted to all the phases in the life of the engine. Indeed, it can be introduced into the engine "calibration" procedure conventionally performed before this engine enters service. It can also be performed periodically by the engine management computer throughout the life of this engine, to correct any drift due to parts losing their settings or becoming worn.

The method according to the invention can also be applied individually to each of the engine cylinders, to the advantage of the overall efficiency of this engine.

As an alternative to the embodiment described hereinabove of the method according to the invention, the computer may command the emission of a number of sparks other than 3, namely 4, 5, 6 or more sparks, increasing the number of sparks making it possible proportionately to increase the "robustness" of the method.

Also, the "learning" process according to the invention, during which the optimum value of the instant of opening of the injector is learnt can be performed by setting, initially, the "angular or time" difference that separates two successive sparks in the series of sparks, to a fairly high value to cover a broad range of variations in this instant of opening. Other series of sparks may then be emitted, during later combustion strokes, with an increasingly small "spacing", making it possible to home in on the optimum position of the instant of opening.

An equivalent result can be obtained by first of all emitting a series of a great amount of closely-spaced sparks and by repeating the emission gradually eliminating those sparks that are emitted outside the actual combustion stroke.

Furthermore, it is equally possible to home in on the instant of initiation of combustion as it is on the instant when this combustion ends, by monitoring the signal delivered by the sensor 8, or the current flowing through the spark plug 2, as was seen earlier. By thus precisely evaluating the duration of the combustion, it is possible to get a more precise estimate of the torque delivered by the engine, which estimate is used by the torque management or control means, by combustion diagnosis means or, more generally, by any engine management means likely to benefit from this information.

The present invention also makes it possible gradually to vary the torque over time in order to eliminate torque surges as the transmission of a motor vehicle powered by an internal combustion engine for example changes gear.

Figure 3:
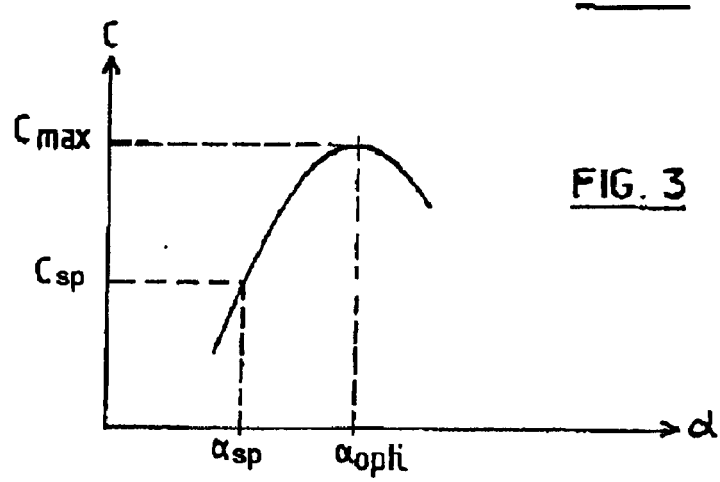
FIG. 3 is a graph illustrating an alternative form of the method according to the invention.

Indeed it is known that the torque delivered by such an engine varies, all other things being equal, with the value of the ignition advance angle, the graph of FIG. 3 illustrating this "bell curve" variation centered on the value $\alpha_{opti}$. The torque delivered therefore decreases when the ignition advance angle deviates from the value $\alpha_{opti}$, either upwards or downwards. The torque delivered can thus be fixed at any predetermined setpoint value $C_{sp}$, lower than $C_{max}$, by setting the ignition advance angle to the corresponding value $\alpha_{sp}$ and by substituting this value $\alpha_{sp}$ for the value $\alpha_{opti}$ in the method for setting the instant of opening of the injectors according to the present invention. The angle $\alpha_{sp}$ will preferably be chosen to be smaller than $\alpha_{opti}$, to avoid problems of combustion instability (pinging, etc) encountered with ignition advance angles greater than $\alpha_{opti}$.

Of course, the invention is not restricted to the embodiment described and depicted, which was given merely by way of example. Thus, although the invention is described hereinabove in the context of a stratified-charge direct-injection internal combustion engine, it would be just as applicable to a homogeneous-charge direct-injection engine.

What is claimed is:

1. A method for setting the instant of opening of a fuel injector (3) in at least one (1) of the cylinders of a direct-injection internal combustion engine, notable in that:

a) a series of sparks is emitted into said cylinder (1), filled with an air/fuel mixture to be ignited, at predetermined successive instants, b) the one of said sparks that initiates said ignition of said mixture is identified, c) the time difference separating the instant of emission of said spark from a predetermined ignition instant able to ensure that said engine supplies a predetermined mechanical power is evaluated, and d) the instant of opening of said fuel injector (3) is corrected as a function of said difference, so as to initiate subsequent ignitions of the air/fuel mixture in said cylinder (1) at said predetermined instant.

2. The method as claimed in claim 1, characterized in that said predetermined ignition instant ensures that said engine produces a predetermined torque.

3. The method as claimed in claim 2, characterized in that said predetermined torque is the maximum torque that the engine can deliver, for a given engine speed (N) and load (Ch).

4. The method as claimed in claim 1, characterized in that, during successive phases of combustion of air/fuel mixtures in said cylinder, the number and/or separation of the sparks in said series of sparks is varied so as gradually to pinpoint the optimum instant for the opening of the injector.

5. The method as claimed in claim 1, characterized in that the spark in the series that signals the end of combustion is also identified so as to evaluate the total combustion time and from that deduce an estimate of the torque delivered by the engine.

6. A device for implementing the method as claimed in claim 1, characterized in that it comprises:

a) means (2, 6) able to emit a series of sparks into said engine cylinder (1) when this cylinder is full of an air/fuel mixture that is to be ignited, b) means (8) for detecting ignition of said mixture and delivering a corresponding signal, and c) calculation means (5) sensitive to said signal and able to control, on the one hand, said means for emitting said series of sparks so that said sparks are emitted at predetermined respective instants and, on the other hand, the instant of opening of said fuel injector (3) in said engine cylinder (1), on the basis of information contained in said signal.

7. The device as claimed in claim 6, characterized in that said detection means (8) consist of a member from the group formed of: a pressure sensor, an ionization detector, a member measuring a monitored current in the spark plug (2) of said cylinder (1).

8. The device as claimed in claim 6, characterized in that it forms part of the direct-injection internal combustion engine management means.

* * * * *